United States Patent
Cranford et al.

(10) Patent No.: US 9,032,539 B2
(45) Date of Patent: May 12, 2015

(54) AUTOMATIC RECOVERY OF LICENSE KEY INFORMATION

(71) Applicant: LENOVO Enterprise Solutions (Singapore) Pte, Ltd., New Tech Park (SG)

(72) Inventors: Yamilka F. Cranford, Morrisville, NC (US); Tu T. Dang, Cary, NC (US); Michael C. Elles, Apex, NC (US); Loc X. Nguyen, Raleigh, NC (US); Mark G. Noll, Raleigh, NC (US)

(73) Assignee: LENOVO Enterprise Solutions (Singapore) Pte. Ltd., New Tech Park (SG)

( * ) Notice: Subject to any disclaimer, the term of this patent is extended or adjusted under 35 U.S.C. 154(b) by 37 days.

(21) Appl. No.: 13/869,248

(22) Filed: Apr. 24, 2013

(65) Prior Publication Data
US 2014/0325663 A1   Oct. 30, 2014

(51) Int. Cl.
*H04N 7/16* (2011.01)
*G06F 21/50* (2013.01)

(52) U.S. Cl.
CPC ...................... *G06F 21/50* (2013.01)

(58) Field of Classification Search
CPC ......................................................... H04N 7/16
USPC .................................................. 726/26.3, 26
See application file for complete search history.

(56) References Cited

U.S. PATENT DOCUMENTS

| 7,137,011 B1* | 11/2006 | Harari et al. .................. 713/189 |
| 8,650,055 B2* | 2/2014 | Davie ........................... 705/7.11 |
| 2005/0114265 A1* | 5/2005 | Satkunanathan et al. ....... 705/59 |
| 2010/0322416 A1 | 12/2010 | Aldis |
| 2012/0047242 A1 | 2/2012 | Iwasaki et al. |
| 2012/0131684 A1* | 5/2012 | Lynch ............................ 726/29 |

FOREIGN PATENT DOCUMENTS

| EP | 1793323 A2 | 6/2007 |
| WO | 2007097826 A2 | 8/2007 |

OTHER PUBLICATIONS

IBM, "Dynamic System Analysis Installation and User's Guide", IBM Systems, 2009, pp. 1-108.
IBM, "The IBM Mainframe Today: System z Strengths and Values", RedBooks, 2009, pp. 1-34.
IBM, "Using IBM System x Features on Demand" International Technical Support Organization, Oct. 2012, pp. 1-90.

* cited by examiner

*Primary Examiner* — Kambiz Zand
*Assistant Examiner* — Thanh Le
(74) *Attorney, Agent, or Firm* — Kunzler Law Group

(57) ABSTRACT

A method, system, and computer program product to manage license key information in a system including a feature requiring the license key information are described. The method includes storing, automatically, a backup copy of the license key information from a primary copy of the license key information after installation of a feature requiring the license key information on the system. The method also includes recovering, automatically, the license key information whenever the license key information is required to be installed.

20 Claims, 2 Drawing Sheets

AUTOMATIC RECOVERY OF LICENSE KEY INFORMATION

BACKGROUND

The present invention relates to a license key, and more specifically, to automatic management of a license key.

Many software applications and hardware enhancements require the entry of license key information for their use. This license key information is typically stored on a planar or a daughter card which may not be available to an end-user, who may not even be aware of how the functionality was installed, or may have been lost by the end-user. As a result, when a system recovery or upgrade process that requires the license key information to be re-input is performed, the user may need to follow a manual process to request a new key. This may lead to a long system outage or even replacement of hardware requiring the license key. In addition, data loss may result from the system booting up with a different configuration due to the absence of the software and/or hardware requiring the license key.

SUMMARY

According to one embodiment of the present invention, a method of managing license key information in a system including a feature requiring the license key information includes storing, automatically, using a memory device of the system, a backup copy of the license key information from a primary copy of the license key information after installation of a feature requiring the license key information on the system; and recovering, automatically, using a processor of the system, the license key information whenever the license key information is required to be installed.

According to another embodiment of the invention, a system to manage license key information includes a backup memory device storing the license key information as a backup copy from a primary copy of the license key information after installation of a feature requiring the license key information; and a processor configured to automatically store the license key information in the backup memory device and automatically recover the license key information for installation during restoration of a feature requiring the license key information.

According to yet another embodiment of the invention, a computer program product for managing license key information in a system including a feature requiring the license key information comprises a computer readable storage medium having program code embodied therewith which is readable and executable by a processor to perform a method. The method includes storing, automatically, a backup copy of the license key information from a primary copy of the license key information after installation of a feature requiring the license key information on the system; and recovering, automatically, the license key information whenever the license key information is required to be installed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, a system upgrade or recovery may require the input of license key information associated with a software application or hardware added to the system. Previously, a user who did not have the license key information available had to follow a manual process to request a new key or acquire the software application or hardware anew. Embodiments of the method and system described herein include automatic backup and recovery of license key information. According to the embodiments described herein, a user of a system may automatically recover functionality of a software application and/or hardware requiring the license key information without having to intervene or provide the information. As discussed below, the system requiring the license key information may be a standalone system, a data center or server farm, or any other type of system that comprises one or more processors.

Figure 1:
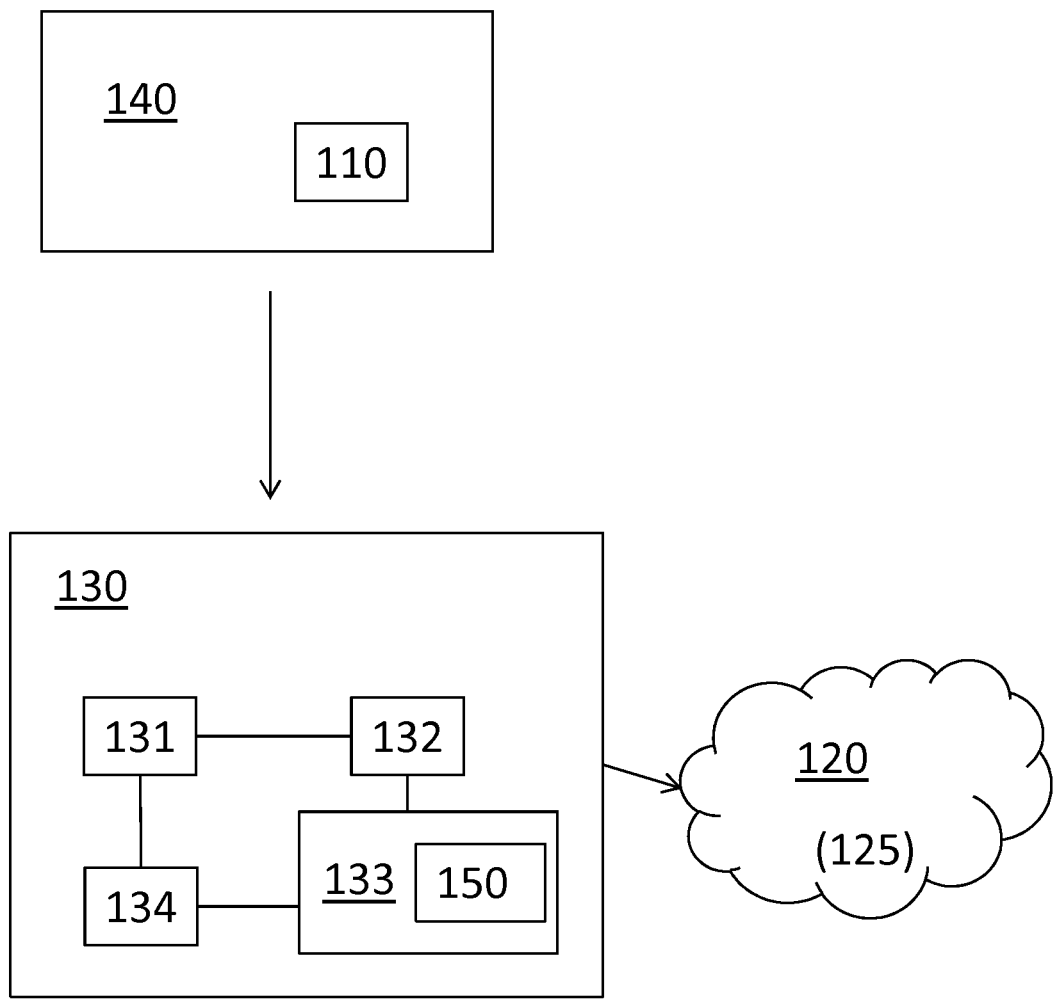
FIG. 1 is a block diagram of a system that uses license key information according to an embodiment of the invention.

FIG. 1 is a block diagram of a system 130 that uses license key information 110 according to an embodiment of the invention. The system 130 includes an input interface 131, one or more processors 132, one or more memory devices 133, and an output interface 134. The system 130 may be part of a network 120 of machines in a data center or server farm, for example, or may be a standalone machine that may access other machines via the network 120. License key information 110 that adds a function (hardware accessory or software application) to the system 130 is first provided as a primary copy 140. The primary copy 140 of the license key information 110 may be a planar or daughter card, for example. According to embodiments of the invention, the license key information 110 in the primary copy 140 is automatically stored in a backup copy 150 in the system 130. The backup copy 150 is stored in persistent memory within a memory device 133 of the system 130 and may be a serial presence detect device or a nonvolatile storage area of a backplane, for example. If the memory device 133 storing the backup copy 150 is replaced, the backup copy 150 is restored to a new memory device 133 of the system 130. The output interface 134 may include a display device that provides a visual prompt or indicator at the system 130 to ensure proper installation of the license key information 110. When the system 130 is part of a network 120, the output interface 134 may be prompted (e.g., by a "call home" message) to alert a remote system administrator to verify that the license key information 110 installation is complete. The network 120 may provide access to a private cloud or remote database 125 that additionally stores the license key information 110.

Figure 2:
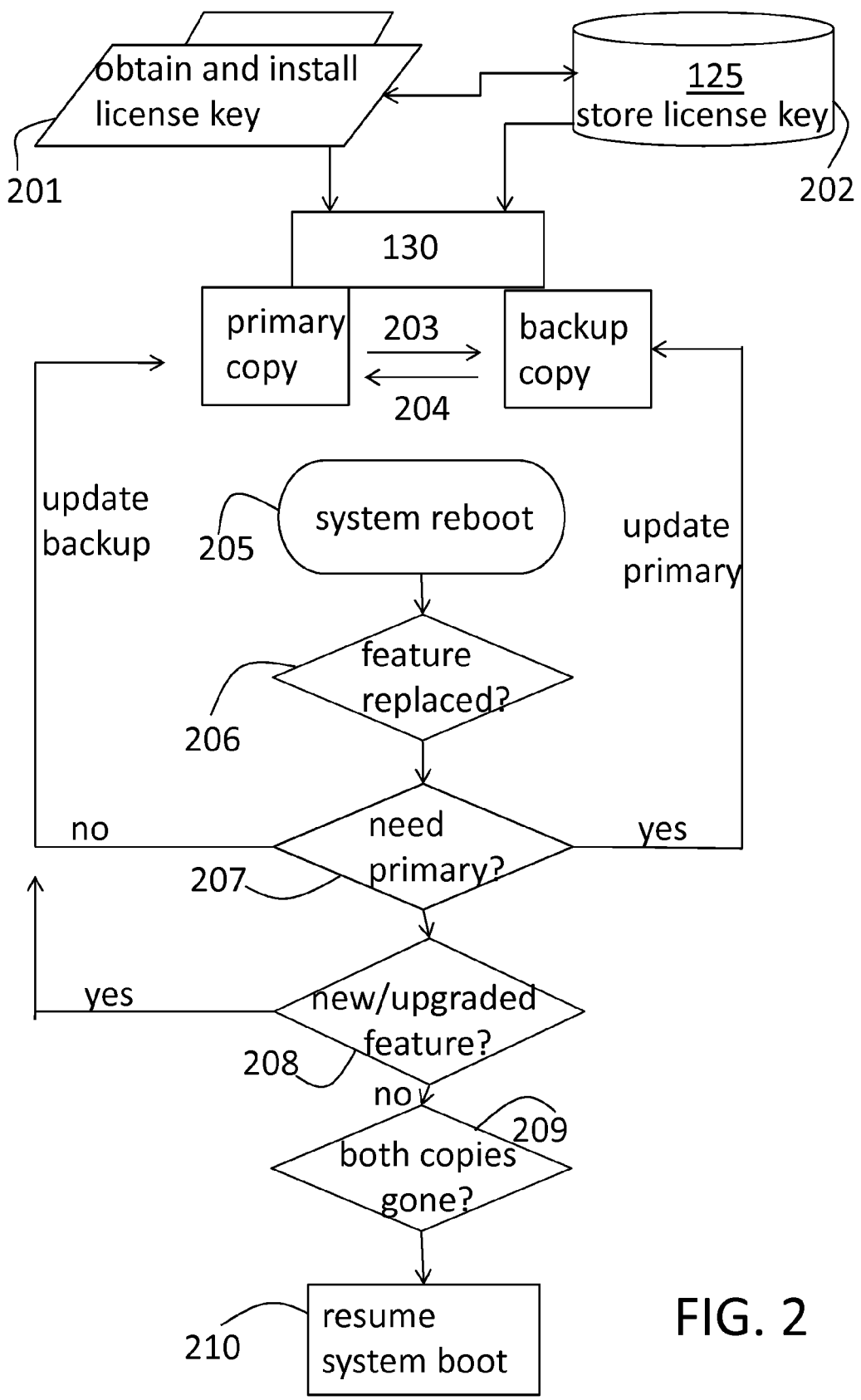
FIG. 2 is a process flow of a method of recovering features requiring license key information according to embodiments of the invention.

FIG. 2 is a process flow of a method of recovering features requiring license key information 110 according to embodiments of the invention. At block 201, a feature (hardware enhancement or software application) requiring license key information 110 is purchased and installed into the system 130. In embodiments in which the system 130 using the license key information 110 is part of a network 120, the license key information 110 may be stored in a remote database 125 (e.g., private cloud) as part of a recovery service at block 202. At 203, a primary copy 140 of the license key information 110 is automatically stored as a backup copy 150. These processes (201 through 203) are performed each time a feature requiring license key information 110 is added to the system 130. Any number of such features (hardware or software) may be included in a system 130. A system reboot process begins at block 205. At block 206, a feature requiring license key information 110 may be replaced in the system 130. At 207, if the primary copy 140 of the license key information 110 is not available (e.g., lost, damaged, never provided), then the backup copy 150 is used to update the primary copy 140 at 204. If the primary copy 140 is available at block 207, then that primary copy of the license key information 110 is automatically used. As noted above, any number of features requiring respective license key information 110 may be added to the system 130. When such a feature is added or an existing feature is upgraded at 208 such that license key information 110 must be added or modified, the primary copy 140 is added or modified, as needed, and the backup copy 150 is automatically updated. At 209, if it is determined that both the primary copy 140 and the backup copy 150 are gone (e.g., lost, damaged), then when the system 130 is part of a network 120, the recovery service may be accessed and the license key information 110 in the remote database 125 may be used. Once all the features requiring license key information 110 are addressed, system boot is resumed at 210.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of managing license key information in a system including a feature requiring the license key information, the method comprising:

storing, automatically, using a memory device of the system, the license key information in a primary copy of the license key information as a backup copy of the license key information after installation of the feature requiring the license key information on the system; and recovering, automatically, using a processor of the system, the license key information whenever the license key information is required to be installed.

2. The method according to claim 1, wherein the storing the backup copy includes storing the license key information in non-volatile memory.

3. The method according to claim 1, wherein the storing the backup copy and storing the primary copy use different memory devices.

4. The method according to claim 1, further comprising storing the license key information automatically in a database remote from the system via a network.

5. The method according to claim 4, wherein the recovering the license key information is based on the database when the backup copy and the primary copy are unavailable.

6. The method according to claim 1, further comprising displaying an indication of an installation status of the license key information when the license key information is recovered and installed.

7. The method according to claim 1, wherein the recovering the license key information is based on the primary copy when the primary copy is available.

8. The method according to claim 1, wherein the recovering the license key information is based on the backup copy when the primary copy is unavailable.

9. A system to manage license key information, comprising:

a backup memory device storing the license key information in a primary copy of the license key information as a backup copy of the license key information after installation of a feature requiring the license key information; and a processor configured to automatically store the license key information in the backup memory device and automatically recover the license key information for installation during restoration of the feature requiring the license key information.

10. The system according to claim 9, wherein the backup memory device is non-volatile memory.

11. The system according to claim 9, wherein a memory device storing the primary copy and the backup memory device are different memory devices.

12. The system according to claim 11, wherein the different memory device is a planar or a daughter card.

13. The system according to claim 9, further comprising a database remote from the backup memory device and accessible through a network, the database storing the license key information.

14. The system according to claim 9, wherein the processor installs the license key information from the database when the primary copy and the backup copy are unavailable.

15. The system according to claim 9, wherein the processor installs the license key information from the primary copy when the primary copy is available.

16. The system according to claim 9, wherein the processor installs the license key information from the backup copy when the primary copy is unavailable.

17. The system according to claim 9, wherein the processor displays an indicator of an installation status of the license key information based on the installation.

18. A computer program product for managing license key information in a system including a feature requiring the license key information, the computer program product comprising a non-transitory computer readable storage medium having program code embodied therewith, the program code readable and executable by a processor to perform a method comprising:

storing, automatically, in a memory device of the system, the license key information in a primary copy of the license key information as a backup copy of the license key information after installation of the feature requiring the license key information on the system; and recovering, automatically, the license key information from the memory device whenever the license key information is required to be installed.

19. The computer program product according to claim 18, further comprising storing the license key information automatically in a database remote from the system via a network.

20. The computer program product according to claim 18, further comprising displaying an indication of an installation status of the license key information when the license key information is recovered and installed.

\* \* \* \* \*